(12) United States Patent
Yao (10) Patent No.: US 12,412,919 B2
(45) Date of Patent: Sep. 9, 2025

(54) LAMINATING MACHINE

(71) Applicant: WUXI LEAD INTELLIGENT EQUIPMENT CO., LTD., Jiangsu (CN)

(72) Inventor: Junfu Yao, Jiangsu (CN)

(73) Assignee: WUXI LEAD INTELLIGENT EQUIPMENT CO., LTD., Wuxi (CN)

( * ) Notice: Subject to any disclaimer, the term of this patent is extended or adjusted under 35 U.S.C. 154(b) by 336 days.

(21) Appl. No.: 17/857,094

(22) Filed: Jul. 4, 2022

(65) Prior Publication Data

US 2022/0336840 A1    Oct. 20, 2022

Related U.S. Application Data (63) Continuation of application No. PCT/CN2021/123899, filed on Oct. 14, 2021.

(30) Foreign Application Priority Data

Feb. 9, 2021   (CN) .......................... 202110178705.2

(51) Int. Cl.
*H01M 10/04* (2006.01)
*B32B 37/06* (2006.01)
(Continued)

(52) U.S. Cl.
CPC ......... *H01M 10/0404* (2013.01); *B32B 37/06* (2013.01); *B32B 38/1808* (2013.01);
(Continued)

(58) Field of Classification Search
CPC .......... H01M 10/0404; H01M 10/0583; B29C 66/0242; B65H 2301/51432; B65H 45/101; B65H 45/103; B65H 45/105
(Continued)

(56) References Cited

U.S. PATENT DOCUMENTS

2006/0051652 A1* 3/2006 Samuels .............. B65H 29/241
429/514
2020/0185753 A1* 6/2020 Kwon ............... H01M 10/0459
(Continued)

FOREIGN PATENT DOCUMENTS

CN         105811017 A      7/2016
CN         108011132 A      5/2018
(Continued)

OTHER PUBLICATIONS

English machine translation of CN105811017 (Original filed along with IDS submitted Jul. 4, 2022) (Year: 2016).*
(Continued)

*Primary Examiner* — Scott W Dodds
(74) *Attorney, Agent, or Firm* — Rivka Friedman (57) ABSTRACT

The present application relates to a laminating machine, including a heating device, a first sheet material device, a second sheet material device, and a first combining device. By using the laminating machine, adhesives on opposite sides of a first combining material strip are heated and melted by the heating device; then, the first sheet material device and the second sheet material device attach a first sheet material and a second sheet material to the opposite sides of the first combining material strip respectively; next, a second combining material strip is formed by the first combining device. Due to the adhesives being melted, bonding strength of the first sheet material and the second sheet material to the first combining material strip can be guaranteed, avoiding a displacement after the first sheet material and the second sheet material are attached to the first combining material strip.

9 Claims, 5 Drawing Sheets

(51) Int. Cl.
   *B32B 38/18*    (2006.01)
   *B65H 45/101*   (2006.01)
   *H01M 4/04*     (2006.01)
   *H01M 6/00*     (2006.01)
   *H01M 10/0583*  (2010.01)
   *B32B 37/14*    (2006.01)

(52) U.S. Cl.
   CPC ............. *H01M 4/04* (2013.01); *H01M 6/005* (2013.01); *H01M 10/04* (2013.01); *H01M 10/0459* (2013.01); *H01M 10/0583* (2013.01); *B32B 37/14* (2013.01); *B65H 45/101* (2013.01); *B65H 2301/51536* (2013.01)

(58) Field of Classification Search
   USPC .............................................. 156/309.9, 322
   See application file for complete search history.

(56) References Cited

U.S. PATENT DOCUMENTS

| | | | |
|---|---|---|---|
| 2022/0006161 A1* | 1/2022 | Kim | H01M 50/566 |
| 2022/0021016 A1* | 1/2022 | Zhao | H01M 10/045 |
| 2022/0052372 A1 | 2/2022 | Shim | |
| 2022/0246991 A1* | 8/2022 | Kim | H01M 10/04 |

FOREIGN PATENT DOCUMENTS

| | | | |
|---|---|---|---|
| CN | 207651617 U | 7/2018 | |
| CN | 110277590 A | 9/2019 | |
| CN | 110943246 A | 3/2020 | |
| CN | 112310423 A | 2/2021 | |
| CN | 112820930 A | 5/2021 | |
| CN | 214477588 U | 10/2021 | |
| KR | 20140062761 A * | 5/2014 | ........ H01M 10/0404 |
| KR | 20190056812 A * | 5/2019 | |
| KR | 20200126767 A | 11/2020 | |
| WO | 2020180028 A1 | 9/2020 | |

OTHER PUBLICATIONS

English translation for KR2019-0056812 (Year: 2019).*
English translation of KR20140062761 (Year: 2014).*
International Search Report in International application No. PCT/CN2021/123899, mailed on Jan. 14, 2022.
European Search Report in application No. 21920104.3, mailed on Aug. 18, 2023.
Chinese Office Action of Invention Patent issued in corresponding Chinese Patent Application No. 202110178705.2 dated Mar. 29, 2024.
Chinese Notification of Grant of Invention Patent issued in corresponding Chinese Patent Application No. 202110178705.2 dated Apr. 29, 2024.
Chinese Notification of Registration Procedures of Invention Patent issued in corresponding Chinese Patent Application No. 202110178705.2 dated Apr. 29, 2024.

* cited by examiner

LAMINATING MACHINE

CROSS-REFERENCE TO RELATED APPLICATION

This disclosure claims priority to a Chinese patent application with an application date of Feb. 9, 2021, an application number of "202110178705.2", and an application title of "LAMINATING MACHINE", which is incorporated by reference in the present application in its entirety.

BACKGROUND OF DISCLOSURE

Technical Field

The present application relates to a technical field of lithium battery manufacturing, in particular to a laminating machine.

Description of Prior Art

Figure 1:
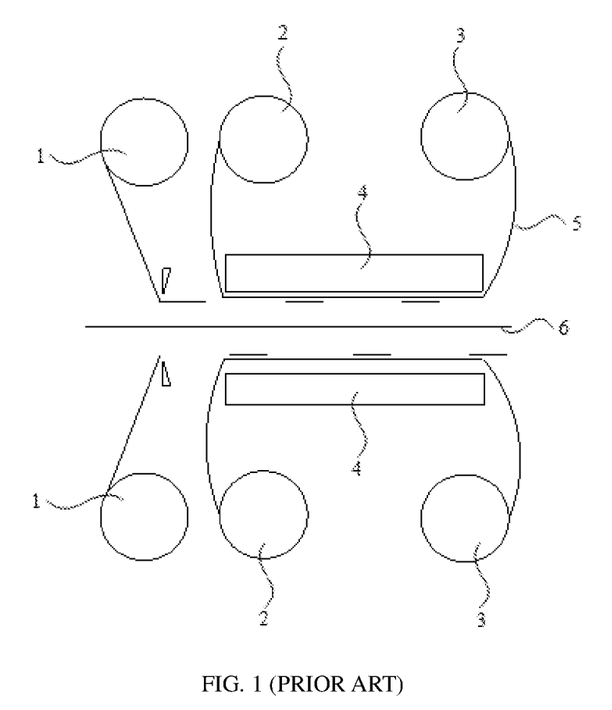
FIG. 1 is a principle schematic diagram of a pole sheet and a diaphragm combining with a PET film and an oven in the prior art.

A manufacturing process of lithium battery includes a step of lamination. In current lamination, belt-shaped pole sheets are usually cut off to form sheet materials, and then, the sheet materials are attached to diaphragms to form a combining material strip, and then, the combining material strip is folded by a laminating device to complete the lamination step. As shown in FIG. 1, the sheet materials and the diaphragms form the combining material strip at present by directly attaching the sheet materials to the diaphragms and then combining by heating and pressing with a polyester (PET) film and an oven, which requires consumption of the PET film, and cost is relatively high.

BRIEF SUMMARY OF DISCLOSURE

Based on this, it is necessary to provide a laminating machine that does not require consumption of a PET film and reduces cost in view of a problem of high manufacturing cost of an existing battery cell.

A laminating machine, comprising:
- a first sheet material device used to provide a first sheet material for one side of a first combining material strip;
- a second sheet material device used to provide a second sheet material for another side of the first combining material strip; and
- a first combining device comprising a heating mechanism and a rolling mechanism; the heating mechanism is arranged downstream of the first sheet material device and the second sheet material device, and is used to heat the first combining material strip attached with the first sheet material and the second sheet material; and the rolling mechanism is arranged downstream of the heating mechanism, and is used to roll the first combining material strip attached with the first sheet material and the second sheet material, so as to form a second combining material strip.

According to an embodiment of the present application, the laminating machine comprises:
- a heating device used to heat the first combining material strip; the first combining material strip comprises a first diaphragm, a first electrode material strip, and a second diaphragm arranged in a stack; and the first electrode material strip has a plurality of creases arranged at intervals along a length direction of the first electrode material strip and extending along its width direction;
- the first sheet material device arranged downstream of the heating device, and the first sheet material device is used to provide the first sheet material for one side of a heated first diaphragm facing away from the first electrode material strip; and
- the second sheet material device arranged downstream of the heating device, and the second sheet material device is used to provide the second sheet material for one side of a heated second diaphragm facing away from the first electrode material strip.

By using the laminating machine, adhesives on opposite sides of the first combining material strip are heated and melted by the heating device, then, the first sheet material device and the second sheet material device attach the first sheet material and the second sheet material to the opposite sides of the first combining material strip respectively, and then, the second combining material strip is formed by the first combining device. Due to the adhesives being melted, bonding strength of the first sheet material and the second sheet material to the first combining material strip can be guaranteed, which avoids a displacement after the first sheet material and the second sheet material are attached to the first combining material strip, and improves quality of a battery cell.

In addition, the first sheet material, the first combining material strip and the second sheet material are sequentially heated and rolled by the heating mechanism and the rolling mechanism, compared with a combination method of a PET film and an oven, it is not necessary to set the PET film, which reduces cost of the PET film, arranging a PET film unwinding mechanism, and arranging a PET film winding mechanism, manufacturing cost is relatively low, and a longer oven is not needed, combination efficiency is improved, and production efficiency is high.

According to an embodiment of the present application, the laminating machine further comprises a second combining device, and the second combining device comprises:
- a first electrode material strip unwinding mechanism, used to unwind the first electrode material strip;
- a crease mechanism, arranged downstream of the first electrode material strip unwinding mechanism, used to form the plurality of creases on the first electrode material strip of a pathway; and
- a first combining mechanism, arranged between the crease mechanism and the heating device, used to combine the first diaphragm and the second diaphragm on opposite sides of the first electrode material strip and to form the first combining material strip.

According to an embodiment of the present application, the crease mechanism comprises a laser cutting head or a cutter.

According to an embodiment of the present application, the creases are penetrating holes arranged at sequential intervals along the width direction of the first electrode material strip and penetrating through the first electrode material strip along its thickness direction.

According to an embodiment of the present application, the penetrating holes comprise one or more of circular holes, rectangular holes, or strip holes.

According to an embodiment of the present application, the creases are a folded area extending along the width direction of the first electrode material strip, and a thickness of the folded area of the first electrode material strip is less than a thickness of other positions.

According to an embodiment of the present application, the first combining device further comprises a feeding mechanism, the feeding mechanism is arranged upstream of the heating mechanism, and is used to attach the first sheet material and the second sheet material to opposite sides of the first combining material strip.

According to an embodiment of the present application, a folded sheet is formed between two adjacent creases on the first electrode material strip;

the second combining material strip comprises a plurality of first stacking components and a plurality of second stacking components, and the first stacking components and the second stacking components are alternately connected, the first stacking components comprise the first sheet material, the first diaphragm, the folded sheet, and the second diaphragm stacked in sequence, the second stacking components comprise the second sheet material, the second diaphragm, the folded sheet, and the first diaphragm stacked in sequence;

the laminating machine further comprises a laminating device, the laminating device is arranged downstream of the rolling mechanism, and is used to fold the second combining material strip along the creases, so that a battery cell is formed by alternately stacking the plurality of first stacking components and the plurality of second stacking components.

According to an embodiment of the present application, a folded sheet is formed between two adjacent creases on the first electrode material strip;

the second combining material strip comprises a plurality of third stacking components and a plurality of fourth stacking components, and the third stacking components and the fourth stacking components are alternately connected, the third stacking components comprise the first sheet material, the first diaphragm, the folded sheet, the second diaphragm, and the second sheet material stacked in sequence, the fourth stacking components comprise the first diaphragm, the folded sheet, and the second diaphragm stacked in sequence;

the laminating machine further comprises a laminating device, the laminating device is arranged downstream of the rolling mechanism, and is used to fold the second combining material strip along the creases, so that a battery cell is formed by alternately stacking the plurality of third stacking components and the plurality of fourth stacking components.

According to an embodiment of the present application, the laminating device comprises a laminating platform and a clamping claw, the laminating platform is arranged downstream of the rolling mechanism, and the laminating platform may reciprocate along a vertical direction, the clamping claw reciprocates between a discharge end of the rolling mechanism and the laminating platform, and is used to clamp the second combining material strip and to fold and place the second combining material strip on the laminating platform.

According to an embodiment of the present application, the laminating device comprises a laminating platform and a clamping claw, the laminating platform is arranged downstream of the rolling mechanism, and the laminating platform may reciprocate along a vertical direction, the clamping claw reciprocates between a discharge end of the rolling mechanism and the laminating platform, and is used to clamp the second combining material strip and to fold and place the second combining material strip on the laminating platform.

BRIEF DESCRIPTION OF DRAWINGS

In order to more clearly illustrate embodiments of the present application or a technical solution in the prior art, the accompanying drawings that need to be used in a description of the embodiments or the prior art will be briefly introduced as follows, obviously, the drawings in the following description are only the embodiments of the present application. For those skilled in the art, other drawings can also be obtained according to the disclosed drawings without creative efforts.

DETAILED DESCRIPTION OF PREFERRED EMBODIMENTS

In order to make the above objects, features and advantages of the present application more clearly understood, specific embodiments of the present application will be described in detail below with reference to the accompanying drawings. In a following description, numerous specific details are set forth in order to provide a thorough understanding of the present application. However, the present application can be implemented in many other ways different from those described here, and those skilled in the art can make similar improvements without violating a connotation of the present application. Therefore, the present application is not limited by the specific embodiments disclosed below.

In the description of the present application, it should be understood that, an orientation or positional relationship indicated by terms "center", "longitudinal", "lateral", "length", "width", "thickness", "upper", "lower", "front", "back", "left", "right", "vertical", "horizontal", "top", "bottom", "inner", "outer", "clockwise", "counterclockwise", "axial", "radial", "circumferential" is based on the orientation or positional relationship shown in the accompanying drawings, and is only for convenience of describing the present application and simplifying the description, rather than indicating or implying that a device or element referred to must be provided with a particular orientation, be constructed and operate in a particular orientation, and therefore should not be understood as a limitation to the present application.

In addition, terms "first" and "second" are only used for descriptive purposes and should not be understood as indicating or implying relative importance or implying a number of indicated technical features. Therefore, a feature delimited with "first", "second" may expressly or implicitly include at least one of that features. In a description of the present application, "a plurality" means at least two, such as two, three, etc., unless expressly and specifically defined otherwise.

In the present application, unless expressly specified and limited otherwise, terms "installed", "communicated", "connected", "fixed" and other terms should be interpreted in a broad sense, for example, it can be a fixed connection, a detachable connection, or an integrated; it can be a mechanical connection or an electrical connection; it can be directly connected, or indirectly connected through an intermediate medium, and it can be an internal communication between two elements or an interaction relationship between the two elements, unless otherwise explicitly defined. For those of ordinary skill in the art, specific meanings of the above terms in the present application can be understood according to specific situations.

In the present application, unless expressly stated and defined otherwise, a first feature "on" or "under" a second feature may be that the first feature is in direct contact with the second feature, or the first feature and the second feature are indirectly contacted through an intermediary. In addition, the first feature being "above", "over" and "on" the second feature may mean that the first feature is directly above or obliquely above the second feature, or simply means that the first feature is higher than the second feature in a horizontal direction. The first feature being "below", "under" and "below" the second feature may mean that the first feature is directly below or obliquely below the second feature, or simply means that the first feature is lower than the second feature in a horizontal direction.

It should be noted that when an element is referred to as being "fixed to" or "arranged on" another element, it can be directly on another element, or an intervening element may also be present. When an element is referred to as being "connected" to another element, it can be directly connected to another element or intervening elements may also be present. Terms "vertical", "horizontal", "upper", "lower", "left", "right" and similar expressions used here are only for a purpose of illustration and do not represent an only embodiment.

In order to facilitate an understanding of technical solutions of the present application, the prior art is described here in conjunction with FIG. 1: currently, a laminating machine adopting a PET film and an oven includes a pole sheet unwinding mechanism 1, a PET film unwinding mechanism 2, a PET film winding mechanism 3, and an oven component 4, to realize combination of a sheet material and a diaphragm 6, namely, the oven component 4 rolled with a PET film 5 is arranged on opposite sides of the diaphragm 6, the PET film 5 is unwound by the PET film unwinding mechanism 2, and the PET film 5 is wound by the PET film winding mechanism 3 to move with the diaphragm 6 and a pole sheet, and the pole sheet is pressed tightly against the diaphragm 6 during a process of movement, to avoid an offset of the pole sheet; the PET film 5, the diaphragm 6 located between two layers of the PET films 5, and the pole sheet are heated and pressed by the oven component 4, so as to realize combining of the pole sheet and the diaphragm 6.

A method of the PET film and the oven is adopted to combine the pole sheet on the diaphragm 6, which requires consumption of the PET film 5. And at a same time, it is also necessary to set the PET film unwinding mechanism 2 to unwind the PET film and set the PET film winding mechanism 3 to wind the PET film, material cost and device cost are high, and a volume of the device is too large, and in order to achieve suitable combining temperature when the oven component 4 is heated and pressed, it is necessary to ensure that the pole sheet and the diaphragm are heated in the oven for a long time, therefore, a longer oven needs to be selected, resulting in higher cost of the oven, a large space occupation, and low production efficiency.

Figure 2:
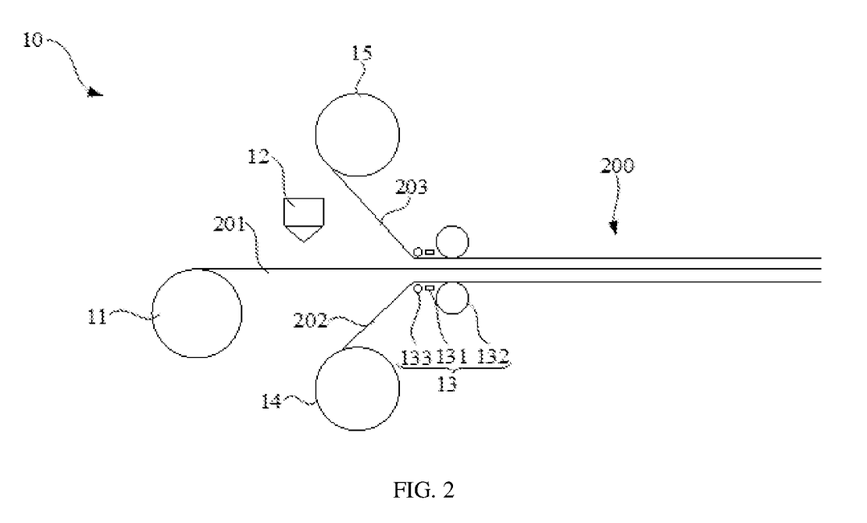
FIG. 2 is a schematic structural diagram of a second combining device in an embodiment of the present application.

As shown in FIG. 2, a second combining device 10 provided in an embodiment of the present application includes a first electrode material strip unwinding mechanism 11, a crease mechanism 12, and a first combining mechanism 13; the first electrode material strip unwinding mechanism 11 is used to unwind a first electrode material strip 201; the crease mechanism 12 is arranged downstream of the first electrode material strip unwinding mechanism 11; the first combining mechanism 13 is arranged downstream of the crease mechanism 12.

The crease mechanism 12 is used to form a plurality of creases located on the first electrode material strip 201 and arranged at intervals along a length direction of the first electrode material strip 201 and extending along its width direction. The first combining mechanism 13 is used to combine a first diaphragm 202 and a second diaphragm 203 on opposite sides of the first electrode material strip 201 and to form a first combining material strip 200.

Wherein, the first electrode material strip 201 is a belt-shaped pole sheet.

By arranging the above second combining device 10, the crease mechanism 12 forms the plurality of creases on the first electrode material strip 201. The first diaphragm 202 and the second diaphragm 203 are attached to the opposite sides of the first electrode material strip 201 to form the first combining material strip 200, during a process of folding the first combining material strip 200, the first combining material strip 200 can be folded directly along the creases. Compared with the prior art of firstly cutting off pole sheets into sheet materials and then performing lamination, the second combining device 10 uses belt-shaped pole sheets directly without cutting, which effectively improves efficiency of subsequent lamination. At a same time, it can also avoid more burrs caused by cutting the pole sheets, which improves quality of a battery.

It should be noted that the second combining device 10 is used to form the first combining material strip 200. The first electrode material strip 201 of the first combining material strip 200 in the embodiment has the plurality of creases, so that a subsequent folding is facilitated. Whereas during folding of the first combining material strip 200, when the first combining material strip 200 is folded, the polo sheet may be laid on the first combining material strip 200 and then folded to form a battery cell according to the actual process, which will not be repeated in this embodiment.

In addition, it should be noted that a hardness of the pole sheet is greater than a hardness of the first diaphragm 202 and a hardness of the second diaphragm 203, and an existing lamination method is to fold the pole sheet in a form of a sheet material, whereas in this embodiment, it is convenient to fold the belt-shaped pole sheet, so the creases are formed on the first electrode material strip 201, namely, the belt-shaped pole sheet.

In some embodiments, the second combining device 10 further includes a first diaphragm unwinding mechanism 14, the first diaphragm unwinding mechanism 14 is arranged upstream of the first combining mechanism 13, and is used to unwind the first diaphragm 202. Furthermore, the second combining device 10 further includes a second diaphragm unwinding mechanism 15, the second diaphragm unwinding mechanism 15 is arranged upstream of the first combining mechanism 13, and is used to unwind the second diaphragm 203.

In some embodiments, the crease mechanism 12 includes a laser cutting head or a cutter, the laser cutting head and the cutter are both used to form the creases on the belt-shaped pole sheet along its width direction, and the plurality of creases are evenly arranged at intervals along its length direction.

Figure 3:
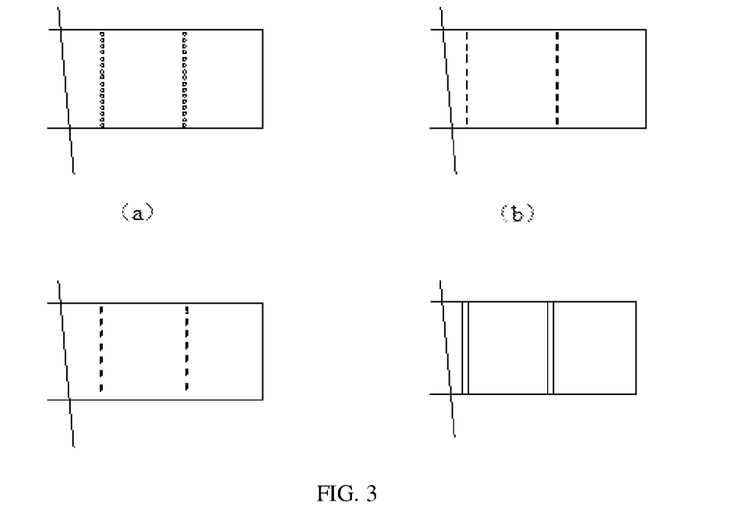
FIG. 3 is a schematic structural diagram of a first electrode material strip processed by a crease mechanism in the second combining device shown in FIG. 2.

It should be noted that as shown in (a), (b), and (c) of FIG. 3, the creases on the belt-shaped pole sheet can be penetrating holes opened on the pole sheet by the laser cutting head or the cutter. The penetrating holes are arranged at sequential intervals along a width direction of the first electrode material strip 201 and penetrating through the first electrode material strip 201 along its thickness direction, forms of penetrating holes include one or more of circular holes, rectangular holes, and strip holes.

Of course, it may be as shown in (d) of FIG. 3, the creases can also be a folded area extending along the width direction of the first electrode material strip 201, and part of carbon powder in a dotted area is removed by laser, so that a carbon powder layer in this area is less than a carbon powder layer in other positions, namely, a thickness of the folded area of the first electrode material strip 201 is less than a thickness of other positions, resulting in weakening strength of the area, which facilitates folding.

In some embodiments, the first diaphragm 202 and the second diaphragm 203 both have adhesives on opposite sides of the first diaphragm 202 and the second diaphragm 203. The adhesives are melted after the first diaphragm 202 and the second diaphragm 203 in the first combining material strip 200 are initially attached to the belt-shaped pole sheet together, and then by heating and pressing of the first combining mechanism 13, namely, a combination processing. The first diaphragm 202 and the second diaphragm 203 are attached to the belt-shaped pole sheet together to form the first combining material strip 200. At a same time, during a subsequent folding, adhesive on one side of the first diaphragm 202 facing away from the belt-shaped pole sheet and adhesive on one side of the second diaphragm 203 facing away from the belt-shaped pole sheet can also ensure attaching and fixation during folding.

In some embodiments, the first combining mechanism 13 includes a first heating component 131 and a first rolling component 132. The first heating component 131 is used to heat the first diaphragm 202, the first electrode material strip 201, and the second diaphragm 203, making the adhesive on the one side of the first diaphragm 202 and the adhesive on the one side of the second diaphragm 203 melt. The first rolling component 132 is used to roll the first diaphragm 202, the first electrode material strip 201, and the second diaphragm 203, so that the first diaphragm 202, the first electrode material strip 201, and the second diaphragm 203 are attached together to form the first combining material strip 200.

Furthermore, the first combining mechanism 13 further includes a feeding component 133. The feeding component 133 is arranged downstream of the crease mechanism 12, and arranged upstream of the first heating component 131, and is used to perform a guiding process on the first diaphragm 202 unwound from the first diaphragm unwinding mechanism 14, the second diaphragm 203 unwound from the second diaphragm unwinding mechanism 15, and the first electrode material strip 201 unwound from the first electrode material strip unwinding mechanism 11, making the first diaphragm 202 and the second diaphragm 203 attach to the opposite sides of the first electrode material strip 201.

In practical application, the feeding component 133 guides the first diaphragm 202, the first electrode material strip 201, and the second diaphragm 203 respectively through two feeding rollers; the first heating component 131 can heat the first diaphragm 202, the first electrode material strip 201, and the second diaphragm 203 through a heating block; the first rolling component 132 can be two pressing rollers clamping outside the first diaphragm 202 and the second diaphragm 203 to roll the first diaphragm 202, the first electrode material strip 201, and the second diaphragm 203.

Figure 4:
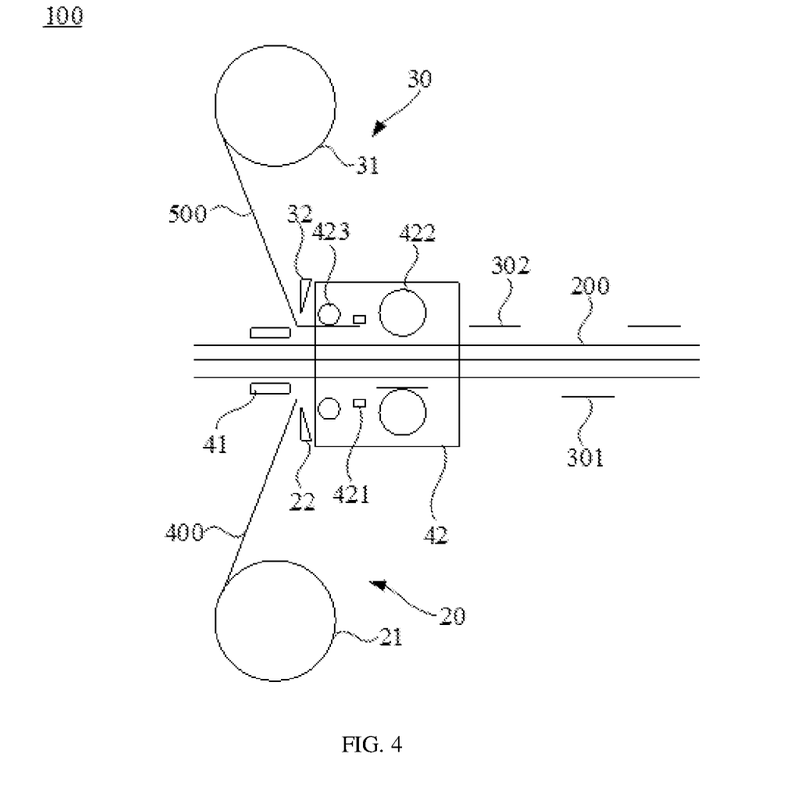
FIG. 4 is a schematic structural diagram of a laminating machine in an embodiment of the present application.

As shown in FIG. 4, a laminating machine 100 is further provided in the embodiment, the laminating machine 100 includes a heating device 41, a first sheet material device 20, and a second sheet material device 30; the heating device 41 is used to heat the first combining material strip 200; the first sheet material device 20 and the second sheet material device 30 are both arranged downstream of the heating device 41; the first sheet material device 20 is used to provide a first sheet material 301 for one side of a heated first combining material strip 200; the second sheet material device 30 is used to provide a second sheet material 302 for another side of the heated first combining material strip 200.

Furthermore, the laminating machine further includes a first combining device 42, the first combining device 42 includes a heating mechanism 421 and a rolling mechanism 422. The heating mechanism 421 is arranged downstream of the first sheet material device 20 and the second sheet material device 30, and is used to heat the first combining material strip 200 attached with the first sheet material 20 and the second sheet material 30. The rolling mechanism 422 is arranged downstream of the heating mechanism 421, and is used to roll the first combining material strip 200 attached with the first sheet material 301 and the second sheet material 302, so as to form a second combining material strip.

Wherein, the first combining material strip 200 is formed by the second combining device 10 in an above embodiment, therefore the first combining material strip 200 includes the first diaphragm 202, the first electrode material strip 201, and the second diaphragm 203 arranged in a stack.

Specifically, the first sheet material device 20 is used to provide the first sheet material 301 for one side of a heated first diaphragm 202 facing away from the first electrode material strip 201; the second sheet material device 30 is used to provide the second sheet material 302 for one side of a heated second diaphragm 203 facing away from the first electrode material strip 201.

The first diaphragm 202 and the second diaphragm 203 both have adhesives on the opposite sides of the first diaphragm 202 and the second diaphragm 203, so the first combining material strip 200 also has adhesives on opposite sides of the first combining material strip 200. By adopting the laminating machine, the adhesives on the opposite sides of the first combining material strip 200 are firstly heated and melted by the heating device 41; then, the first sheet material 301 and the second sheet material 302 are attached to the opposite sides of the first combining material strip 200 by the first sheet material device 20 and the second sheet material device 30 respectively; and next, the second combining material strip is formed by a processing of the first combining device 42. Due to the adhesives being melted, bonding strength of the first sheet material 301 and the second sheet material 302 to the first combining material strip 200 can be guaranteed, which avoids a displacement after the first sheet material 301 and the second sheet material 302 are attached to the first combining material strip 200, and improves quality of the battery cell.

In addition, the first sheet material 301, the first combining material strip 200, and the second sheet material 302 are sequentially heated and rolled by the heating mechanism 421 and the rolling mechanism 422, compared with a combination method of the PET film and the oven, it is not necessary to set the PET film, which reduces cost of the PET film, arranging a PET film unwinding mechanism, and arranging a PET film winding mechanism, manufacturing cost is relatively low, and a longer oven is not needed, combination efficiency is improved, and production efficiency is high.

It should be noted that the first combining mechanism 13 of the second combining device 10 will be heated by the first heating component 131 when combining the first diaphragm 202, the first electrode material strip 201, and the second diaphragm 203. However, a combined first combining material strip 200 will be cooled during a conveying process, so the heating device 41 is subsequently arranged upstream of the first sheet material device 20 and the second sheet material device 30 to heat the first combining material strip 200.

In a similar way, since the first combining material strip 200 will be cooled during the conveying process, the heating mechanism 421 is arranged upstream of the rolling mechanism 422 to heat before rolling, making the first sheet material 301 and the second sheet material 302 closely attach to the first combining material strip 200.

In addition, the adhesives on the opposite sides of the first diaphragm 202 and the second diaphragm 203 are usually heat-sensitive adhesives, the heating device 41 heats the first combining material strip 200 to activate an activity of the heat-sensitive adhesives, which prevents a temperature decrease during the conveying process from affecting an adhesive force of the heat-sensitive adhesives, and ensures that the first sheet material 301 and the second sheet material 302 are tightly and stably attached to the opposite sides of the first combining material strip 200, and avoids a displacement of the first sheet material 301 and the second sheet material 302. The heating mechanism 421 of the first combining device 42 heats the first combining material strip 200 attached with the first sheet material 301 and the second sheet material 302, so as to maintain the activity of the heat-sensitive adhesives, at a same time, it can also prevent the temperature decrease during the conveying process from affecting the adhesive force of the heat-sensitive adhesives, making the first sheet material 301 and the second sheet material 302 closely attach to the first combining material strip 200 under a pressing force of the rolling mechanism 422.

In some embodiments, the heating device 41 includes two heating blocks, the first combining material strip 200 passes through the two heating blocks, the two heating blocks are used to heat the first combining material strip 200. In other embodiments, the heating device 41 may be a heating roller, which is not limited here. In a similar way, the heating mechanism 421 may also be a heating block or a heating roller.

At a same time, if there is no preheating to improve bonding strength of the first sheet material 301 and the second sheet material 302 to the first combining material strip, the first sheet material 301 and the second sheet material 302 are easily displaced during subsequent conveying or rolling.

In some embodiments, the first sheet material device 20 includes a second electrode material strip unwinding mechanism 21 and a first cutting mechanism 22. The second electrode material strip unwinding mechanism 21 is used to unwind a second electrode material strip 400. The first cutting mechanism 22 is located downstream of the second electrode material strip unwinding mechanism 21, the first cutting mechanism 22 is used to cut the second electrode material strip 400 to form the first sheet material 301.

Furthermore, the second sheet material device 30 includes a third electrode material strip unwinding mechanism 31 and a second cutting mechanism 32. The third electrode material strip unwinding mechanism 31 is used to unwind a third electrode material strip 500. The second cutting mechanism 32 is located downstream of the third electrode material strip unwinding mechanism 31, the second cutting mechanism 32 is used to cut the third electrode material strip 500 to form the second sheet material 302.

It should be noted that the above second electrode material strip 400 and the above third electrode material strip 500 are same as the first electrode material strip 201, which are all belt-shape pole sheets; after the first cutting mechanism 22 and the second cutting mechanism 32 cut off the second electrode material strip 400 and the third electrode material strip 500 respectively to form the first sheet material 301 and the second sheet material 302, the first sheet material 301 and the second sheet material 302 can be initially attached to the first diaphragm 202 and the second diaphragm 203 respectively. Or other mechanisms are added to initially attach the first sheet material 301 and the second sheet material 302 to the first diaphragm 202 and the second diaphragm 203 respectively, which is not limited here.

In some embodiments, the first combining device 42 further includes a feeding mechanism 423, the feeding mechanism 423 is arranged upstream of the heating mechanism 421. The feeding mechanism 423 is used to attach the first sheet material 301 and the second sheet material 302 to the opposite sides of the first combining material strip.

Specifically, the feeding mechanism 423 includes two feeding rollers, the two feeding rollers are used to attach the first sheet material 301 and the second sheet material 302 to the opposite sides of the first combining material strip 200.

The feeding mechanism 423, the heating mechanism 421, and the rolling mechanism 422 are integrated into the first combining device 42, which makes a structure more compact; compared with the combination method of the PET film and the oven, it is not necessary to set the PET film unwinding mechanism, the PET film winding mechanism, and the longer oven, and occupied space is also reduced.

Before a further description, it should be noted that after the crease mechanism 12 of the second combining device 10 forms the plurality of creases on the first electrode material strip 201, a folded sheet is formed between two adjacent creases on the first electrode material strip 201.

The first sheet material 301 and the second sheet material 302 are both pole sheets, and when the first electrode material strip 201 is a negative electrode, the first sheet material 301 and the second sheet material 302 are both positive electrode pole sheets; when the first electrode material strip 201 is a positive electrode, the first sheet material 301 and the second sheet material 302 are negative electrode pole sheets. While the first diaphragm 202 and the second diaphragm 203 may be same.

This way, during folding, the battery cell is formed by stacking a predetermined number of the first sheet materials 301, the first diaphragms 202, the folded sheets, the second diaphragms 203, the second sheet materials 302, the second diaphragms 203, the folded sheets, and the first diaphragms 202 in sequence. Specifically, the first sheet material 301 (the second sheet material 302) is a pole sheet, and is one of the positive electrode and the negative electrode, and the first electrode material strip 201 is another of the positive electrode and the negative electrode; after the first sheet material 301, the second sheet material 302, and the first combining material strip 200 are combined into a second combining material strip and folded repeatedly, a battery cell with a diaphragm, a positive electrode pole sheet, a diaphragm, and a negative electrode pole sheet sequentially and cyclically stacked will be formed.

Figure 5:
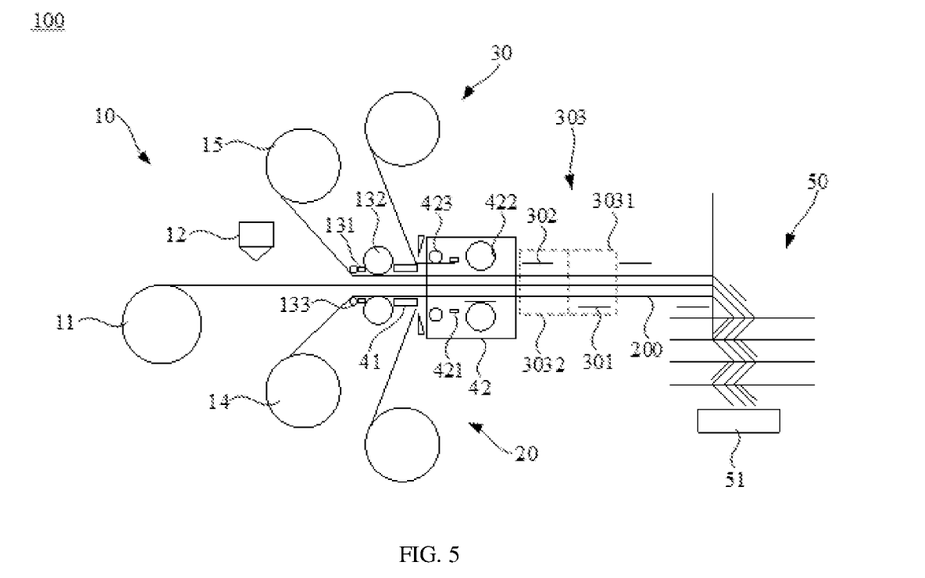
FIG. 5 is a schematic structural diagram of a laminating machine in a first embodiment of the present application.

Please refer to FIG. 5, in a first embodiment, the first sheet material 301 and the second sheet material 302 are alternately arranged at intervals along a length direction of the first combining material strip 200, the first sheet material 301 and the second sheet material 302 adjacent to each other along the length direction of the first combining material strip 200 correspond to two adjacent folded sheets respectively.

It should be noted that the plurality of creases on the first electrode material strip 201 are evenly arranged at intervals along the length direction of the first electrode material strip 201, and each of the first sheet materials 301 and each of the second sheet materials 302 both correspond to the folded sheet, so all the first sheet materials 301 and all the second sheet materials 302 are evenly arranged at intervals along the length direction of the first electrode material strip 201, namely, they are evenly arranged at intervals along the length direction of the first combining material strip 200.

In practical application, a distance between two adjacent first sheet materials 301 along the length direction of the first combining material strip 200 is greater than a width of the second sheet material 302. A distance between two adjacent second sheet materials 302 along the length direction of the first combining material strip 200 is greater than a width of the first sheet material 301.

It should be noted that in FIG. 5, a width direction of the first sheet material 301 and a width direction of the second sheet material 302 are the length direction of the first combining material strip 200.

In the embodiment, the second combining material strip 303 includes a plurality of first stacking components 3031 and a plurality of second stacking components 3032. The first stacking components 3031 and the second stacking components 3032 are alternately connected. The first stacking components 3031 comprise the first sheet material 301, the first diaphragm 202, the folded sheet, and the second diaphragm 203 stacked in sequence. The second stacking components 3032 comprise the first diaphragm 202, the folded sheet, the second diaphragm 203, and the second sheet material 302 stacked in sequence.

In the embodiment, the laminating machine further includes a first laminating device 50. The first laminating device 50 is arranged downstream of the rolling mechanism 422, and is used to fold the second combining material strip 303 along the creases, so that the above-mentioned battery cell is formed by alternately stacking the plurality of first stacking components 3031 and the plurality of second stacking components 3032.

Furthermore, the first laminating device 50 includes a laminating platform 51, the second combining material strip 303 is transported vertically from top to bottom and is folded on the laminating platform 51.

It should be noted that in this embodiment, folding of the second combining material strip 303 may be realized by using an air blowing structure or a material pushing bracket to cooperate with gravity, or folding of the second combining material strip 303 may be realized by directly relying on gravity.

When the air blowing structure is adopted, the air blowing structures are provided on opposite sides of the second combining material strip 303, and the air blowing structures are all located above the laminating platform 51. The air blowing structures on the opposite sides alternately blow air toward the second combining material strip 303 during a conveying process of the second combining material strip 303. Since the first electrode material strip 201 has creases, the blowing structures blow the second combining material strip 303 to bend, thereby ensuring that the second combining material strip 303 is folded on the laminating platform 51.

When the material pushing bracket is adopted, the material pushing brackets are provided on opposite sides of the second combining material strip 303, and the material pushing brackets are located above the laminating platform 51. The material pushing brackets on the opposite sides are staggered in a vertical direction. In addition, the material pushing brackets on the opposite sides can be close to each other, so as to exert an external force in opposite directions on the two adjacent folded sheets, so that the adjacent folded sheets are bent, so as to ensure that the second combining material strip 303 is folded on the laminating platform 51.

When directly relying on gravity, since the first electrode material strip 201 has creases, and the second combining material strip 303 is transported downward onto the laminating platform 51 in the vertical direction. The laminating platform 51 is provided with two baffles, under an action of gravity, the first electrode material strip 201 will be bent and folded at the creases due to a restriction of the two baffles, so as to realize folding of the second combining material strip 303.

Figure 6:
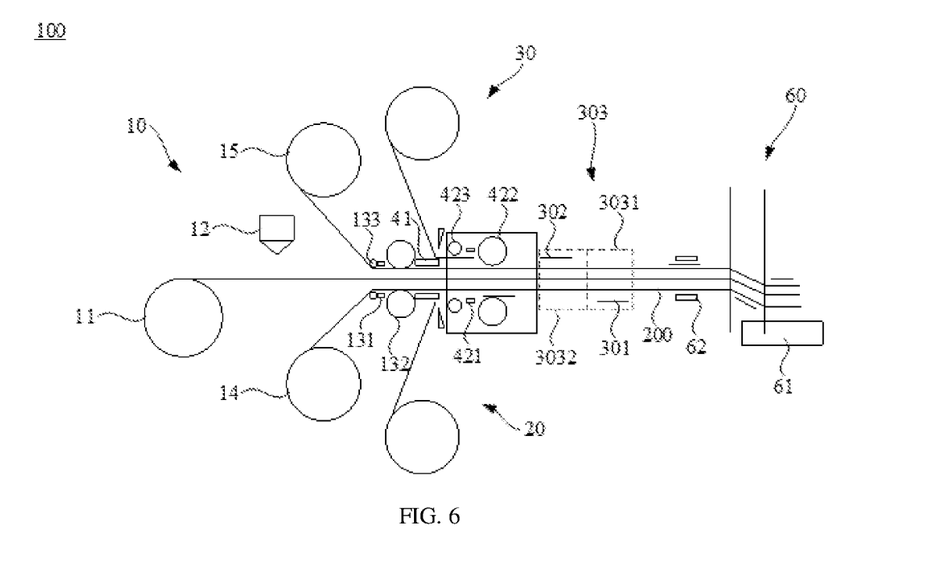
FIG. 6 is a schematic structural diagram of a laminating machine in a second embodiment of the present application.

Please refer to FIG. 6, in a second embodiment, the second combining material strip 303 includes a plurality of first stacking components 3031 and a plurality of second stacking components 3032. The first stacking components 3031 and the second stacking components 3032 are alternately connected. The first stacking components 3031 comprise the first sheet material 301, the first diaphragm 202, the folded sheet, and the second diaphragm 203 stacked in sequence. The second stacking components 3032 comprise the first diaphragm 202, the folded sheet, the second diaphragm 203, and the second sheet material 302 stacked in sequence.

In the embodiment, the laminating machine further includes a second laminating device 60. The second laminating device 60 is arranged downstream of the rolling mechanism 422, and is used to fold the second combining material strip 303 along the creases, so that the battery cell is formed by alternately stacking the plurality of first stacking components 3031 and the plurality of second stacking components 3032.

It can be understood that a function of the second laminating device 60 in this embodiment is same as a function of the first laminating device 50 in the first embodiment.

Furthermore, the second laminating device 60 includes a laminating platform 61 and a clamping claw 62. The laminating platform 61 is arranged downstream of the rolling mechanism 422, the laminating platform 61 can reciprocate along a vertical direction. The clamping claw 62 reciprocates between a discharge end of the rolling mechanism 422 and the laminating platform 61, and is used to clamp the second combining material strip 303 and to fold the second combining material strip 303 and to place it on the laminating platform 61.

Taking a specific embodiment as an example to illustrate: initially, the second sheet material 302 is firstly arranged at a head end of the first combining material strip 200 by the second sheet material device 30; and then, the first sheet material 301 is placed on the first combining material strip 200 by the first sheet material device 20; and next, the second sheet material 302 and the first sheet material 301 are placed in sequence, and are sequentially processed by the feeding mechanism 423, the heating mechanism 421, and the rolling mechanism 422 to form the second combining material strip 303.

In other words, the second stacking component 3032 of the second combining material strip 303 in the embodiment is located at a head end. The second combining material strip 303 is the plurality of second stacking components 3032 alternately connected with the plurality of first stacking components 3031.

The clamping claw 62 grabs the second combining material strip 303 at the discharge end of the rolling mechanism 422 and translates it onto the laminating platform 61. At this time, the first diaphragm 202 of the first combining material strip 200 is in contact with the laminating platform 61, namely, the second stacking component 3032 at the head end is in contact with the laminating platform 61; the laminating platform 61 descends, the clamping claw 62 returns to the discharge end of the rolling mechanism 422 to continue to grab a second stacking component 3032; and next, the clamping claw 62 is translated toward the laminating platform 61 to move a grabbed second stacking component 3032 onto the laminating platform 61. Because the laminating platform 61 descends, the second stacking component 3032 at the head end of the second combining material strip 303 also descends. When the clamping claw 62 moves the grabbed second stacking component 3032 to the laminating platform 61, the first stacking component 3031 adjacent to the second stacking component 3032 at the head end will cover the second stacking component 3032 at the head end. Moreover, the grabbed second stacking component 3032 will also cover the first stacking component 3031, so as to realize folding.

It should be noted that a grabbing method of the clamping claw 62 is to grab one stacking component at intervals, namely, there is an interval of one stacking component between the stacking component grabbed each time and the stacking component grabbed at a previous time. When grabbing the second stacking component 3032 as described above, the first stacking components 3031 and the second stacking components 3032 are alternately connected, so when the clamping claw 62 grabs the second stacking component 3032 directly above a previous second stacking component 3032, the first stacking component 3031 located between the two second stacking components 3032 will be folded.

Figure 7:
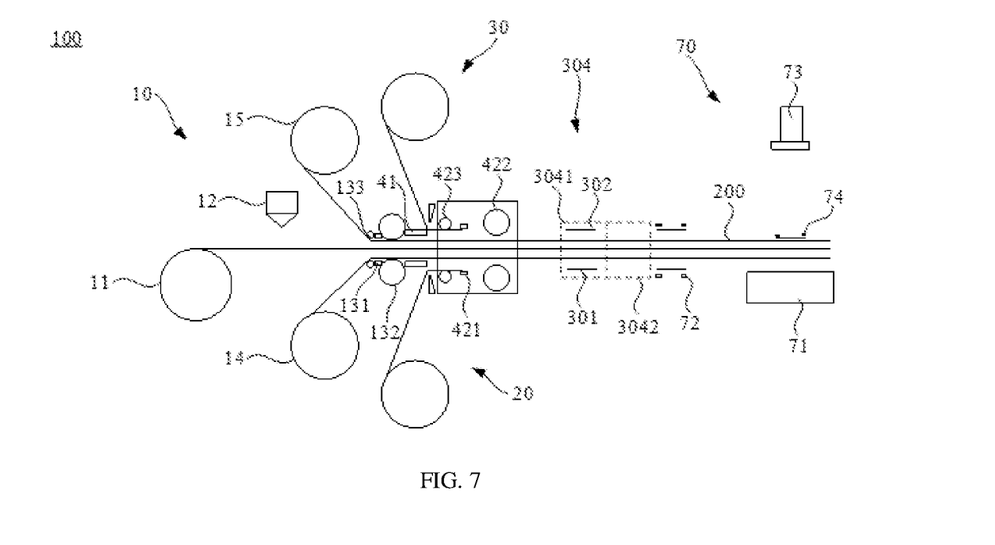
FIG. 7 is a schematic structural diagram of a laminating machine in a state in a third embodiment of the present application.
Figure 8:
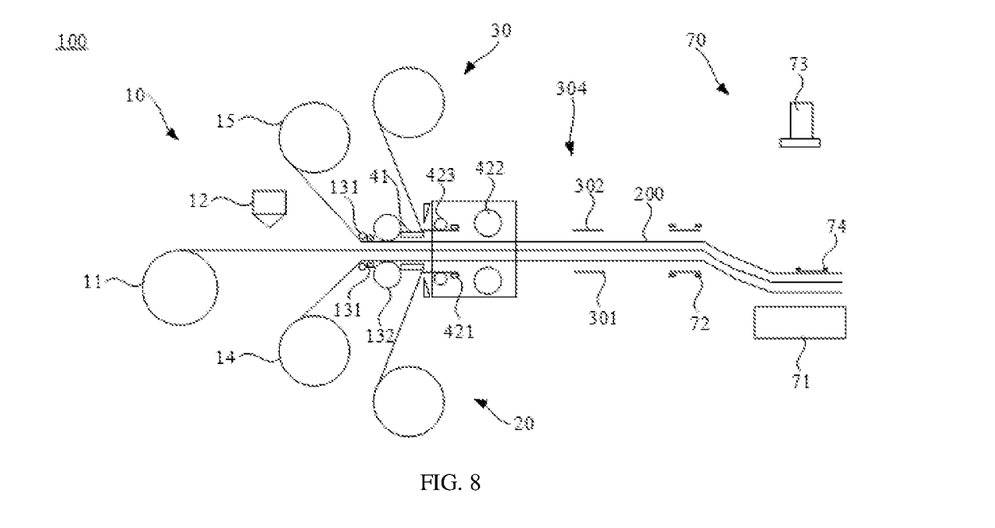
FIG. 8 is a schematic structural diagram of the laminating machine shown in FIG. 7 in another state.
Figure 9:
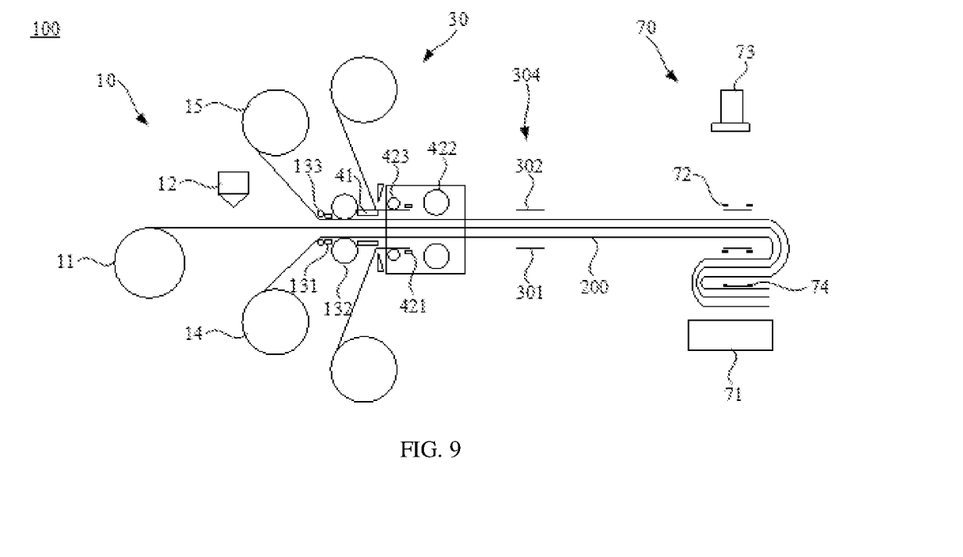
FIG. 9 is a schematic structural diagram of the laminating machine shown in FIG. 7 in yet another state.

Please refer to FIGS. 7 to 9, in a third embodiment, the second combining material strip 304 includes a plurality of third stacking components 3041 and a plurality of fourth stacking components 3042. And the third stacking components 3041 and the fourth stacking components 3042 are alternately connected. The third stacking components 3041 include the first sheet material 301, the first diaphragm 202, the folded sheet, the second diaphragm 203, and the second sheet material 302 stacked in sequence. The fourth stacking components 3042 include the first diaphragm 202, the folded sheet, and the second diaphragm 203 stacked in sequence.

In the embodiment, the laminating machine further includes a third laminating device 70. The third laminating device 70 is arranged downstream of the rolling mechanism 422, and is used to fold the second combining material strip 304 along the creases, so that the battery cell is formed by alternately stacking the plurality of third stacking components 3041 and the plurality of fourth stacking components 3042.

Furthermore, the third laminating device 70 includes a laminating platform 71 and a clamping claw 72. The laminating platform 71 is arranged downstream of the rolling mechanism 422, and the laminating platform 71 can reciprocate in a vertical direction. The clamping claw 72 reciprocates between a discharge end of the rolling mechanism 422 and the laminating platform 71, and is used to clamp the second combining material strip 304 and to fold the second combining material strip 304 and place it on the laminating platform 71.

In practical application, the third laminating device 70 further includes a pressing plate 73, and the pressing plate 73 can reciprocate in the vertical direction for pressing the battery cell on the laminating platform 71, so that the first sheet material 301, the first combining material strip 200, the second sheet material 302, and the first combining material strip 200 arranged in a stack are pressed tightly to ensure that each layer structure in the battery cell is tightly attached.

Specifically, the third laminating device 70 further includes a pressing tool 74, and the pressing tool 74 can move in the vertical direction along with the laminating platform 71 and is movable relative to the laminating platform 71 for pressing against the battery cell.

It should be noted that after the clamping claw 72 clamps the second combining material strip 304 and folds the second combining material strip 304 and places it on the laminating platform 71, the pressing plate 73 presses the battery cell tightly, and the clamping claw 72 is withdrawn, the pressing tool 74 presses the battery cell, and the pressing plate 73 is withdrawn to prevent the battery cell from loosening or a displacement during a laminating process, which affects an accuracy of the lamination.

In addition, the second laminating device 60 in the second embodiment may also be provided with a pressing plate and a pressing tool for pressing the battery cell.

Please refer to FIGS. 7 to 9, an embodiment is used as an example to illustrate: initially, a piece of the second sheet material 302 is placed at a head end of the first combining material strip 200 (corresponding to a position of a first folded sheet); and then, the first sheet material 301 and the second sheet material 302 corresponding to a third folded sheet are placed on the first combining material strip 200; and then, the first sheet material 301 and the second sheet material 302 corresponding to a fifth folded sheet are placed; and by analogy, the first sheet material 301 and the second sheet material 302 are repeatedly placed between every other folded sheet, and the first sheet material 301 and the second sheet material 302 placed each time correspond to a same folded sheet. The first sheet material 301 and the second sheet material 302 are placed on the first combining material strip 200 and then sequentially processed by the feeding mechanism 423, the heating mechanism 421, and the rolling mechanism 422 to form the second combining material strip 304. In other words, in this embodiment, when folded, the head end is the third stacking component 3041 with only the second sheet material 302.

In other embodiments, the third stacking component 3041 of the second combining material strip 304 may be located at a head end when folded, or the fourth stacking component 3042 may be located at the head end when folded. Folding methods in the three embodiments are same. Here, with reference to FIGS. 7 to 9, when folded, the head end is the third stacking component 3041 with only the second sheet material 302, which is used as an example for illustration:

Before grabbing, the pressing plate 73 moves to escape, and the clamping claw 72 grabs the second combining material strip 304 at the discharge end of the rolling mechanism 422 and translates it onto the laminating platform 71; at this time, the third stacking component 3041 with only the second sheet material 302 at the head end of the first combining material strip 200 is in contact with the laminating platform 71; and the pressing plate 73 is pressed downward to compress the third stacking component 3041 tightly; and then, the clamping claw 72 is withdrawn and returns to the discharge end of the rolling mechanism 422 to continue to grab a second third stacking component 3041; the pressing tool 74 is pressed against the third stacking component 3041, after the pressing tool 74 is pressed, the pressing plate 73 is withdrawn.

Next, the clamping claw 72 grabs the second third stacking component 3041 and translates it onto the laminating platform 71, the pressing tool 74 keeps pressing and descends with the laminating platform 71; the third stacking component 3041 at the head end of the second combining material strip 304 descends accordingly; and when the clamping claw 72 grabs the second third stacking component 3041 and translates it onto the laminating platform 71, the fourth stacking component 3042 adjacent to the third stacking component 3041 at the head end will cover the third stacking component 3041 at the head end. Moreover, a grabbed second third stacking component 3041 will also cover the fourth stacking component 3042, so as to realize folding.

After folding, the pressing plate 73 presses the grabbed second third stacking component 3041 tightly again, and then, the clamping claw 72 is withdrawn to continue to grab a sequential third stacking component 3041; and then, the pressing tool 74 is pulled out and is pressed against another third stacking component 3041 again and descends with the laminating platform 71.

It should be noted that a grabbing method of the clamping claw 72 is to grab one stacking component at intervals, namely, there is one stacking component between the stacking component grabbed each time and the stacking component grabbed a previous time. When grabbing the third stacking component 3041 as described above, the third stacking components 3041 and the fourth stacking components 3042 are alternately connected, so when the clamping claw 72 grabs the second third stacking component 3041 directly above a previous third stacking component 3041, the fourth stacking component 3042 located between the two third stacking components 3041 will be folded.

It can be understood that actions of the clamping claw 72 and the laminating platform 71 of the third laminating device 70 in this embodiment are same as actions of the clamping claw 62 and the laminating platform 61 of the second laminating device 60 in the second embodiment.

In combination with the above-mentioned embodiments, it should be concluded that the first sheet material 301, the second sheet material 302, and the folded sheet in the above-mentioned embodiments are all pole sheets. The first diaphragm 202 and the second diaphragm 203 are both diaphragms. Therefore, the battery cell formed after folding is actually a structure formed by stacking the pole sheets and the diaphragm with a plurality of times.

At a same time, in the first embodiment and in the second embodiment, structures of the second combining material strip are same, so a same label is used to facilitate understanding; structures of the second combining material strip in the third embodiment is different from structures of the second combining material strip in the first embodiment and the second embodiment, so different labels are used to facilitate differentiation. Moreover, manufacturing of two types of the second combining material strips can be realized by changing a laminating sequence of the first sheet material device 20 and the second sheet material device 30, which can be determined without any doubt by those skilled in the art according to the description in the third embodiment.

In addition, it can be understood that the first laminating device 50, the second laminating device 60, and the third laminating device 70 are all laminating devices used to fold the second combining material strip. The first laminating device 50 and the second laminating device 60 can be used to alternately stack the plurality of third stacking components and the plurality of fourth stacking components to form the battery cell. The third laminating device 70 can also be used to alternately stack the plurality of first stacking components and the plurality of second stacking components to form the battery cell.

In a specific embodiment, the first electrode material strip 201 is a negative electrode, and the first sheet material 301 and the second sheet material 302 are positive electrode pole sheets. In another specific embodiment, the first electrode material strip 201 is a positive electrode, and the first sheet material 301 and the second sheet material 302 are negative electrode pole sheets.

Technical features of the above-described embodiments can be combined arbitrarily, in order to simplify description, all possible combinations of the technical features in the above-described embodiments are not described. However, as long as there is no contradiction in the combination of these technical features, they should be considered within a scope of the description in this specification.

The above-mentioned embodiments only represent several embodiments of the present application, and the descriptions are relatively specific and detailed, but should not be construed as limiting a scope of the present application. It should be pointed out that for those skilled in the art, without departing from a concept of the present application, several modifications and improvements can be made, which all belong to a protection scope of the present application. Therefore, the protection scope of the patent of the present application shall be subject to appended claims.

What is claimed is:

1. A laminating machine, comprising:
    a first electrode material strip unwinding mechanism configured to unwind a first electrode material strip;
    a crease mechanism arranged downstream of the first electrode material strip unwinding mechanism, wherein the crease mechanism is configured to form a plurality of creases on the first electrode material strip, the plurality of creases are arranged at intervals along a length direction of the first electrode material strip and extend along a width direction of the first electrode material strip, and a folded sheet is formed between every two adjacent creases of the plurality of creases;
    a first diaphragm unwinding mechanism and a second diaphragm unwinding mechanism, wherein the first diaphragm unwinding mechanism is configured to unwind a first diaphragm, and the second diaphragm unwinding mechanism is configured to unwind a second diaphragm;

a first combining mechanism arranged downstream of the crease mechanism, the first diaphragm unwinding mechanism, and the second diaphragm unwinding mechanism, wherein first combining mechanism is configured to combine the first diaphragm and the second diaphragm on opposite sides of the first electrode material strip and to form a first combining material strip;

a heating device arranged downstream of the first combining mechanism, wherein the heating device is configured to heat the first combining material strip;

a first sheet material device arranged downstream of the heating device, wherein the first sheet material device comprises a second electrode material strip unwinding mechanism and a first cutting mechanism, the second electrode material strip unwinding mechanism is configured to unwind a second electrode material strip, and the first cutting mechanism is located downstream of the second electrode material strip unwinding mechanism and is configured to cut the second electrode material strip to form a first sheet material and provide the first sheet material for one side of the heated first diaphragm facing away from the first electrode material strip;

a second sheet material device arranged downstream of the heating device, wherein the second sheet material device comprises a third electrode material strip unwinding mechanism and a second cutting mechanism, the third electrode material strip unwinding mechanism is configured to unwind a third electrode material strip, and the second cutting mechanism is located downstream of the third electrode material strip unwinding mechanism and is configured to cut the third electrode material strip to form a second sheet material and provide the second sheet material for one side of the heated second diaphragm facing away from the first electrode material strip;

a first combining device comprising a feeding mechanism, a heating mechanism arranged downstream of the feeding mechanism, and a rolling mechanism arranged downstream of the heating mechanism, wherein the feeding mechanism comprises two feeding rollers configured to attach the first sheet material and the second sheet material to opposite sides of the first combining material strip, the heating mechanism is arranged downstream of the first sheet material device and the second sheet material device, comprises two heating rollers, and is configured to heat the first combining material strip attached with the first sheet material and the second sheet material, and the rolling mechanism is configured to roll the heated first combining material strip attached with the first sheet material and the second sheet material, so as to form a second combining material strip, wherein the second combining material strip comprises a plurality of first stacking components and a plurality of second stacking components, the first stacking components and the second stacking components are alternately connected, the first stacking components comprise the first sheet material, the first diaphragm, the folded sheet, and the second diaphragm stacked in sequence, and the second stacking components comprise the second sheet material, the second diaphragm, the folded sheet, and the first diaphragm stacked in sequence; and a laminating device arranged downstream of the rolling mechanism and configured to fold the second combining material strip along the creases, so that a battery cell is formed by alternately stacking the plurality of first stacking components and the plurality of second stacking components.

2. The laminating machine as claimed in claim 1, wherein the crease mechanism comprises a laser cutting head or a cutter.

3. The laminating machine as claimed in claim 1, wherein the creases are penetrating holes arranged at sequential intervals along the width direction of the first electrode material strip and penetrating through the first electrode material strip along its thickness direction.

4. The laminating machine as claimed in claim 3, wherein the penetrating holes comprise one or more of circular holes, rectangular holes, or strip holes.

5. The laminating machine as claimed in claim 1, wherein the creases are a folded area extending along the width direction of the first electrode material strip, and a thickness of the folded area of the first electrode material strip is less than a thickness of other positions.

6. The laminating machine as claimed in claim 1, wherein the laminating device comprises a laminating platform and a clamping claw, the laminating platform is arranged downstream of the rolling mechanism, and the laminating platform reciprocate along a vertical direction, and the clamping claw reciprocates between a discharge end of the rolling mechanism and the laminating platform, and is used to clamp the second combining material strip and to fold and place the second combining material strip on the laminating platform.

7. A laminating machine, comprising:
a first electrode material strip unwinding mechanism configured to unwind a first electrode material strip;
a crease mechanism arranged downstream of the first electrode material strip unwinding mechanism, wherein the crease mechanism is configured to form a plurality of creases on the first electrode material strip, the plurality of creases are arranged at intervals along a length direction of the first electrode material strip and extend along a width direction of the first electrode material strip, and a folded sheet is formed between every two adjacent creases of the plurality of creases;
a first diaphragm unwinding mechanism and a second diaphragm unwinding mechanism, wherein the first diaphragm unwinding mechanism is configured to unwind a first diaphragm, and the second diaphragm unwinding mechanism is configured to unwind a second diaphragm;
a first combining mechanism arranged downstream of the crease mechanism, the first diaphragm unwinding mechanism, and the second diaphragm unwinding mechanism, wherein first combining mechanism is configured to combine the first diaphragm and the second diaphragm on opposite sides of the first electrode material strip and to form a first combining material strip;
a heating device arranged downstream of the first combining mechanism, wherein the heating device is configured to heat the first combining material strip;
a first sheet material device arranged downstream of the heating device, wherein the first sheet material device comprises a second electrode material strip unwinding mechanism and a first cutting mechanism, the second electrode material strip unwinding mechanism is configured to unwind a second electrode material strip, and the first cutting mechanism is located downstream of the second electrode material strip unwinding mechanism and is configured to cut the second electrode material strip to form a first sheet material and provide the first sheet material for one side of the heated first diaphragm facing away from the first electrode material strip;

a second sheet material device arranged downstream of the heating device, wherein the second sheet material device comprises a third electrode material strip unwinding mechanism and a second cutting mechanism, the third electrode material strip unwinding mechanism is configured to unwind a third electrode material strip, and the second cutting mechanism is located downstream of the third electrode material strip unwinding mechanism and is configured to cut the third electrode material strip to form a second sheet material and provide the second sheet material for one side of the heated second diaphragm facing away from the first electrode material strip;

a first combining device comprising a feeding mechanism, a heating mechanism arranged downstream of the feeding mechanism, and a rolling mechanism arranged downstream of the heating mechanism, wherein the feeding mechanism comprises two feeding rollers configured to attach the first sheet material and the second sheet material to opposite sides of the first combining material strip, the heating mechanism is arranged downstream of the first sheet material device and the second sheet material device, comprises two heating rollers, and is configured to heat the first combining material strip attached with the first sheet material and the second sheet material, and the rolling mechanism is configured to roll the heated first combining material strip attached with the first sheet material and the second sheet material, so as to form a second combining material strip, wherein the second combining material strip comprises a plurality of third stacking components and a plurality of fourth stacking components, and the third stacking components and the fourth stacking components are alternately connected, the third stacking components comprise the first sheet material, the first diaphragm, the folded sheet, the second diaphragm, and the second sheet material stacked in sequence, the fourth stacking components comprise the first diaphragm, the folded sheet, and the second diaphragm stacked in sequence; and a laminating device arranged downstream of the rolling mechanism, and used to fold the second combining material strip along the creases, so that a battery cell is formed by alternately stacking the plurality of third stacking components and the plurality of fourth stacking components.

8. The laminating machine as claimed in claim 7, wherein the laminating device comprises a laminating platform and a clamping claw, the laminating platform is arranged downstream of the rolling mechanism, the laminating platform reciprocate along a vertical direction, and the clamping claw reciprocates between a discharge end of the rolling mechanism and the laminating platform, and is used to clamp the second combining material strip and to fold and place the second combining material strip on the laminating platform.

9. A laminating machine, comprising:
a first electrode material strip unwinding mechanism configured to unwind a first electrode material strip;

a crease mechanism arranged downstream of the first electrode material strip unwinding mechanism, wherein the crease mechanism is configured to form a plurality of creases on the first electrode material strip, the plurality of creases are arranged at intervals along a length direction of the first electrode material strip and extend along a width direction of the first electrode material strip, and a folded sheet is formed between every two adjacent creases of the plurality of creases;

a first diaphragm unwinding mechanism and a second diaphragm unwinding mechanism, wherein the first diaphragm unwinding mechanism is configured to unwind a first diaphragm, and the second diaphragm unwinding mechanism is configured to unwind a second diaphragm;

a first combining mechanism arranged downstream of the crease mechanism, the first diaphragm unwinding mechanism, and the second diaphragm unwinding mechanism, wherein first combining mechanism is configured to combine the first diaphragm and the second diaphragm on opposite sides of the first electrode material strip and to form a first combining material strip;

a heating device arranged downstream of the first combining mechanism, wherein the heating device is configured to heat the first combining material strip;

a first sheet material device arranged downstream of the heating device, wherein the first sheet material device comprises a second electrode material strip unwinding mechanism and a first cutting mechanism, the second electrode material strip unwinding mechanism is configured to unwind a second electrode material strip, and the first cutting mechanism is located downstream of the second electrode material strip unwinding mechanism and is configured to cut the second electrode material strip to form a first sheet material and provide the first sheet material for one side of the heated first diaphragm facing away from the first electrode material strip;

a second sheet material device arranged downstream of the heating device, wherein the second sheet material device comprises a third electrode material strip unwinding mechanism and a second cutting mechanism, the third electrode material strip unwinding mechanism is configured to unwind a third electrode material strip, and the second cutting mechanism is located downstream of the third electrode material strip unwinding mechanism and is configured to cut the third electrode material strip to form a second sheet material and provide the second sheet material for one side of the heated second diaphragm facing away from the first electrode material strip;

a first combining device comprising a feeding mechanism, a heating mechanism arranged downstream of the feeding mechanism, a rolling mechanism arranged downstream of the heating mechanism, wherein the feeding mechanism is configured to attach the first sheet material and the second sheet material to opposite sides of the first combining material strip, the heating mechanism is arranged downstream of the first sheet material device and the second sheet material device, and is configured to heat the first combining material strip attached with the first sheet material and the second sheet material, and the rolling mechanism is configured to roll the heated first combining material strip attached with the first sheet material and the second sheet material, so as to form a second combining material strip, wherein the second combining material strip comprises a plurality of first stacking components and a plurality of second stacking components, the first stacking components and the second stacking components are alternately connected, the first stacking components comprise the first sheet material, the first diaphragm, the folded sheet, and the second diaphragm stacked in sequence, and the second stacking components comprise the second sheet material, the second diaphragm, the folded sheet, and the first diaphragm stacked in sequence; and a laminating device arranged downstream of the rolling mechanism and configured to fold the second combining material strip along the creases, so that a battery cell is formed by alternately stacking the plurality of first stacking components and the plurality of second stacking components, wherein the laminating device comprises:

a laminating platform and a clamping claw, wherein the laminating platform is arranged downstream of the rolling mechanism, and the laminating platform reciprocates along a vertical direction, and the clamping claw reciprocates between a discharge end of the rolling mechanism and the laminating platform, and is used to clamp the second combining material strip and to fold and place the second combining material strip on the laminating platform, a pressing plate, wherein the pressing plate reciprocates in the vertical direction for pressing the battery cell on the laminating platform, so that the first sheet material, the first combining material strip, the second sheet material, and the first combining material strip arranged in a stack are pressed, and a pressing tool, wherein the pressing tool moves in the vertical direction along with the laminating platform and is movable relative to the laminating platform for pressing against the battery cell.

* * * * *